April 14, 1936.  C. KNOWLES ET AL  2,037,635
PROFILING MACHINE
Filed Dec. 30, 1933  2 Sheets-Sheet 1
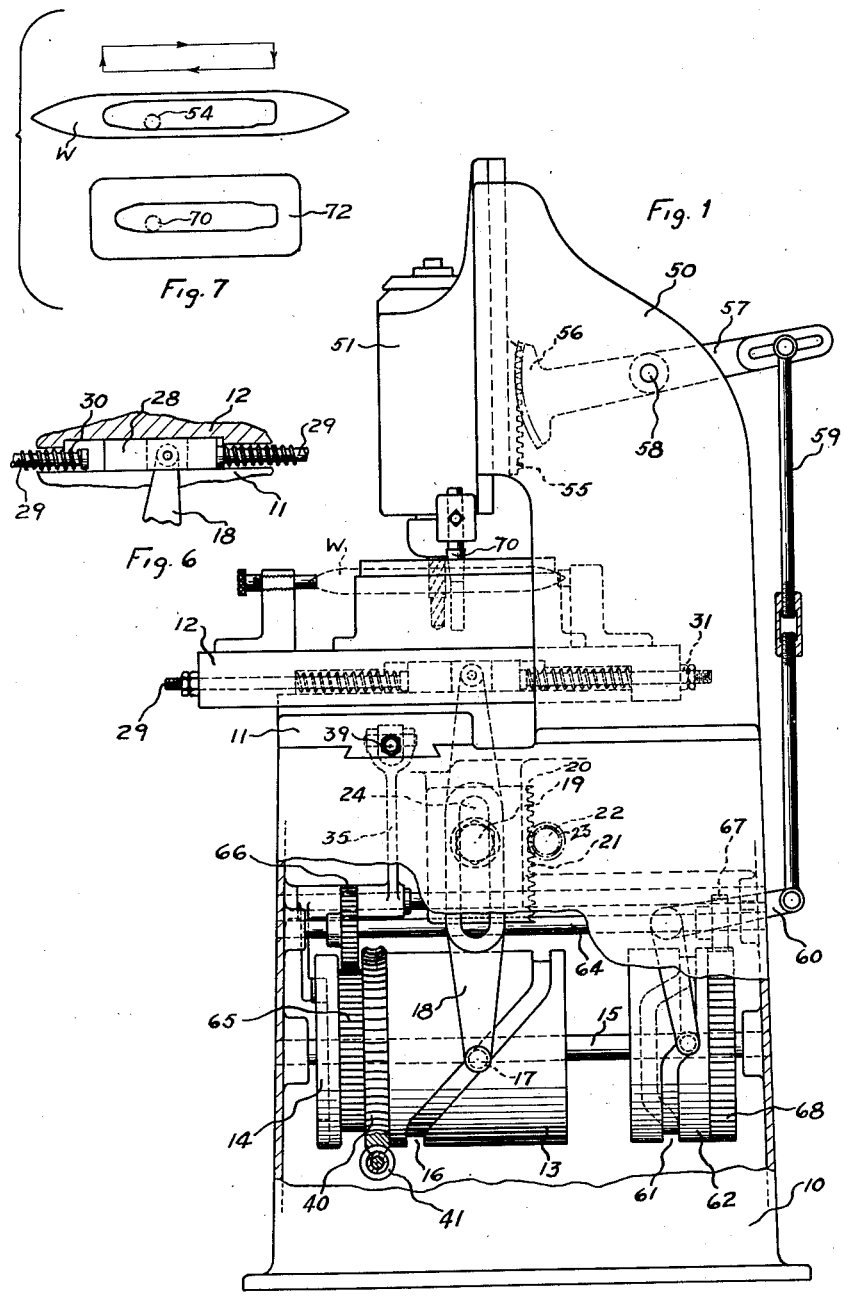
INVENTOR
C. Knowles & W. Law
BY
Joseph K. Schofield
ATTORNEY April 14, 1936.  C. KNOWLES ET AL  2,037,635
PROFILING MACHINE
Filed Dec. 30, 1933   2 Sheets-Sheet 2
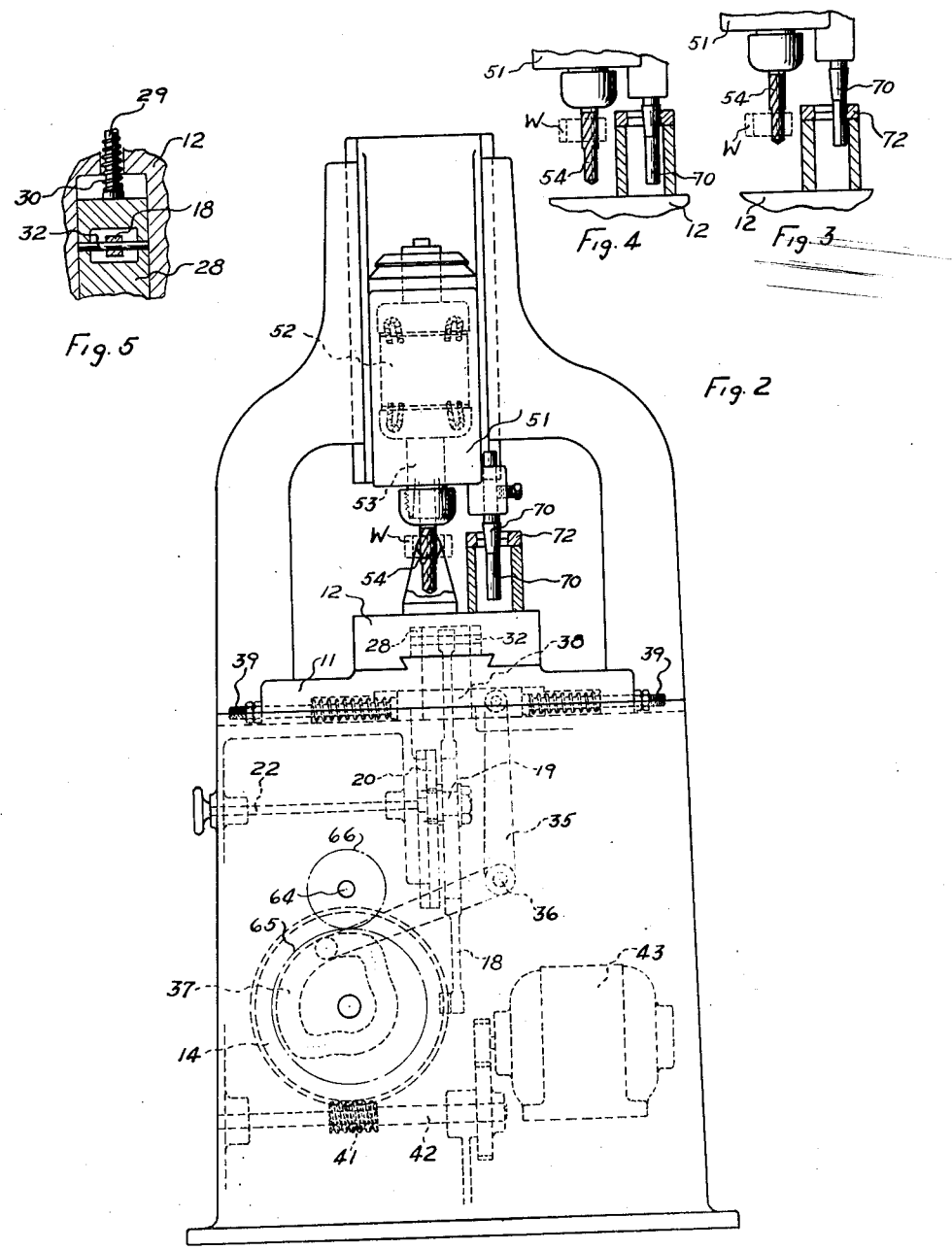
INVENTOR
C. Knowles & W. Law
BY
Joseph K. Schofield
ATTORNEY Patented Apr. 14, 1936

2,037,635

UNITED STATES PATENT OFFICE 2,037,635

PROFILING MACHINE

Carroll Knowles and William Law, West Hartford, Conn., assignors to Pratt & Whitney Company, Hartford, Conn., a corporation of New Jersey Application December 30, 1933, Serial No. 704,682

14 Claims. (Cl. 90—13.4)

This invention relates to a profiling or routing machine and particularly to a machine for cutting out the central opening in wooden shuttles used in automatic looms for weaving textile fabrics.

An object of the present invention is to provide an entirely automatic machine enabling a predetermined generally rectangular contour to be cut within a work piece preferably by two successive operations by a single cutting tool, one operation rough outlining the desired form and the second operation finishing the outline accurately to predetermined size.

Another object of the invention is to provide a work supporting member movable in any direction in a plane, two cams being employed to actuate the work support in directions normal to each other, the motions imparted to the work supporting member by the cams being limited by a template mounted on the support adjacent the work piece continually contacting with a tracer on the cutter or tool support.

A further object of the invention is to provide a tool support for routing or profiling machines having two cutting positions for the tool, one position being for a roughing or preliminary cutting operation employing one portion of the rotating cutting tool and the second or finishing position being effected by an adjacent portion of the tool slightly larger in diameter.

Another object of the invention is to provide a template following tracer adjustable axially relative to the cutter head and cutting tool but normally movable therewith and preferably being provided with a conical portion so that axial adjustments render different diameters operative for accurately cutting to predetermined outlines with cutting tools having slightly different diameters, the tracer being adjustable so that the portion in contact with the template is of equal diameter with the tool.

It is another object to limit the movement of the work supporting members by different portions of a tracer, one portion, preferably cylindrical, being employed when the cutting tool is in its roughing position and another portion slightly increased in diameter being used for the final or finishing operation.

And finally it is an object of the invention to provide two simultaneously rotating cams for actuating the work supporting members, these work positioning cams rotating twice during the cycle of operation of the machine and during a single rotation of a cam controlling the position of the cutter head, cutting tool and tracer.

With these and other objects in view our invention includes the features of construction and operation set forth in the following specification and illustrated in the accompanying drawings.

In the accompanying drawings annexed hereto and forming a part of this specification, we have shown our invention in a shuttle profiling machine but it will be understood that the invention can be otherwise embodied and that the drawings are not to be construed as defining or limiting the scope of the invention, the claims appended to this specification being relied upon for that purpose.

In the drawings:

Figure 1 is a side elevation, partly broken away, showing a complete machine made according to the present invention.

Fig. 2 is a front elevation of the complete machine, the cutting tool and tracer being shown in position for the finishing operation.

Figs. 3 and 4, respectively, are detail views of the tracer and cutter in different operative positions relative to the template and work piece.

Fig. 5 is a fragmentary plan view in section showing the flexible connection between the cam actuating member and the work support.

Fig. 6 is a fragmentary side view in section of the connection between the actuating lever and the work support, and Fig. 7 is a plan view of a shuttle adapted to have its central bobbin receiving opening profiled in the machine described herein, and the template mounted adjacent thereto.

In making shuttles for use in automatic looms for weaving textile fabrics, a block of wood forming the principal member of the shuttle must be suitably profiled to form the bobbin receiving opening. In many standard forms of shuttles these openings are of uniform section entirely through the shuttle. The machine forming the present invention is designed primarily for profiling this central opening of the shuttle within which is placed the yarn carrying bobbin. These openings, in standard forms of shuttles, particularly for modern or automatic looms, are substantially similar in outline and vary relatively slightly in size and are generally rectangular in outline. The machine is therefore particularly designed for use in profiling a wide number of different types or designs of shuttles having substantially similar openings but varying slightly in contour and size one relative to the other.

The operation of profiling these openings in the machine forming the present invention is entirely automatic after placing the shuttle in position in the work support and starting the machine. The shuttle is first actuated in a path to cut out the approximate outline and then the tool is moved to its finishing position and the movements of the shuttle are repeated this time with the tool in position to accurately reproduce the desired outline.

Referring more in detail to the figures of the drawings, the machine is provided with a base 10 on which is slidably mounted a saddle member 11 on which is mounted the work support or table 12. Preferably and as shown in the drawings, the saddle 11 is movable laterally relative to the base 10 upon suitable ways formed therein and the table or support 12 is movable longitudinally of the base upon suitable ways formed in the upper surface of the saddle member 11. By movements either of the saddle 11 or work supporting member 12 or by a combination of movements of these members, the work support 12 may be moved in any direction in a horizontal plane.

To effect movements of the saddle 11 and table 12 cams 13 and 14 are provided within the base 10 suitably mounted for rotation upon or with a horizontal shaft 15. One cam 13, preferably of drum or cylindrical type, is provided with a circumferential cam groove 16 engaged by a cam roller 17 on the lower end of a pivotally mounted arm 18, the upper end of which is pivotally attached to the table 12 in a manner presently to be more fully described. The arm 18 is fulcrumed by a stud or pin 19 outstanding from a vertically movable plate 20 within the base 10 so that the work support 12 may be given varying lengths of movement by equal movements of the roller 17 by cam 13. To adjust the fulcrum 19 rack teeth 21 are formed in the side of the plate 20 carrying the fulcrum pin. A shaft 22 having a pinion 23 on its inner end engaging the rack teeth 21 extends to the outside of the base 10 and may be rotated manually to adjust the vertical position of the plate 20 and fulcrum 19. An elongated slot 24 within the central portion of the pivotal arm 18 permits material vertical adjustment of the fulcrum pin 19 and therefore a wide adjustment of movements of the work support 12 for any one cam groove 16. As the work support 12 is laterally moved slightly by movement transversely of the saddle member 11, the connection between the support 12 and the upper end of the actuating lever 18 is such that limited lateral movement is permitted.

By referring to Figs. 5 and 6 the connection between the lever 18 and the support 12 will be apparent. Housed within a recess within the lower surface of the support 12 is a block 28, the recess being longer than the block 28 so that this block may move longitudinally of the support 12. Extending longitudinally of the support 12 are spring pressed rods 29. These rods are surrounded by helical springs 30 adjacent the inner ends of the rods 29 and bearing against heads on the inner ends of these rods. The opposite ends of the springs 30 take up against shoulders formed in the support 12 and on the outer ends of the rods 29 are nuts 31 bearing against opposite ends of the support 12. The effect of these spring pressed rods 29 is to flexibly connect the lever 18 and block 28 to the support 12, the support 12 being resiliently forced by the lever 18 first compressing one or the other of the springs 30 and forcing the rod 29 surrounded by that spring longitudinally.

As shown in Fig. 5 the lever 18 engages a transverse rod 32 extending through a small opening in the block 28, the recess within the block 28 being sufficiently wide to permit slight lateral movement of the support 12 and block 28 relative to the lever 18. By these means varying lengths of movement may be imparted to the support 12 by equal movements of the block 28 depending upon the amount of compression of the springs 30 and the provision of positive limiting means. The means restraining movement of the support 12 will presently be described.

In order to effect movement of the saddle 11 an oscillating lever or bell crank 35 is pivoted upon a horizontal shaft 36 within the base 10 and has an arm extending to and engaging within a groove 37 in the face of the disc cam 14 mounted for rotation with the cam drum 13. By rotation of the disc 14 the arm 35 is actuated back and forth as determined by the contour of the cam groove 37.

As shown in Fig. 2 of the drawings, the lever 35 is connected to the saddle 11 by means of a block 38 housed within a recess within the lower surface of the saddle. This block 38 engages against the inner ends of spring pressed rods 39 in the same manner as the support 12 so that further description of this connection will be unnecessary. It will be seen, therefore, that the saddle may be moved different distances by equal movements of the lever 35 depending upon the amount compressed by the springs surrounding the rods 39 and by the provision of positive limiting means.

In order to rotate the two cams 13 and 14 a worm wheel 40 is mounted preferably upon one end of the cam drum 13 and is engaged by a worm 41 on a transverse horizontal shaft 42 which may be rotated as indicated in Fig. 2 by a suitable motor 43.

Mounted on the upper horizontal surface of the base 10 is a column 50 having vertical ways on its front face which are engaged by a slidably mounted cutter head 51. This cutter head 51, as shown, is provided with a motor 52 directly or otherwise drivingly attached to a cutter rotating spindle 53, the cutter or tool 54 being mounted upon the spindle and extending downwardly from its lower end. On the rear vertical face of the cutter head 51 rack teeth 55 are formed which are engaged by a segmental gear 56 on an arm 57 pivotally mounted upon a transverse shaft or stud 58 within the column 50. The rear end of the arm 57 is attached by an adjustable reach arm 59 to a bell crank 60 pivotally mounted within the base 10, the other or lower arm of the bell crank 60 being engaged within a cam groove 61 of a second drum cam 62. The shape of this cam groove is such that the cutter head 51 and its tool 54 is moved to three different vertical positions. The uppermost position is an inoperative or loading position, the intermediate position being the roughing position for the tool 54 and the lowermost position being the finishing position.

As the three positions of the cutter are employed one after the other in a complete cycle of operation of the machine, and the work support is actuated twice about its path of movement during this cycle of operations, the drum cam 62 controlling the positions of the cutter head 51 is rotated but once while the cam drum 13 and cam disc 14 for the work support 12 and saddle 11 respectively are rotated twice. For this purpose the drum cam 62 while being mounted upon the same shaft 15 as the first mentioned cams 13 and 14 is driven at one-half their speed by means of an intermediate shaft 64. A gear 65 adjacent the worm wheel 40 for driving the drum and disc cams 13 and 14 is in mesh with a gear 66 on horizontal shaft 64 above the shaft 15, and at the opposite end of this shaft is a smaller gear 67 meshing with a spur gear 68 directly connected to the cutter actuating drum cam 62. The ratio of this gearing between cams 13 and 14 and the cam 62 for the cutter head 51 is two to one so that for two complete revolutions of the worm gear 40 the drum and disc cams 13 and 14, the cutter actuating cam 62 is rotated but once. The speed of rotation of these cams is such that but one rotation of cam 62 and two rotations of cams 13 and 14 take place during the complete traverse of the cutting tool about the desired outline to first rough out and then cut the opening within the shuttle or other work piece to finished dimensions.

Mounted on the cutter head 51 at one side of the tool 54 is a tracer pin 70 clamped adjustably in position and extending parallel with the tool 54. As shown in the figures the pin 70 has an extended cylindrical portion and directly adjacent and above this portion is a conical portion.

Mounted on the upper surface of the work support 12 are retaining means for a work piece W supporting this piece rigidly in horizontal position on the support. As any suitable chucking or clamping means may be used depending upon the type of work piece and operations called for, these means will not require further description. At one side of the work piece W is supported in a horizontal plane a template 72. This template 72 may be in the form of a thin plate having an opening therein corresponding in outline to the opening required in the work piece W. It will be understood that the outline of the template 72 for other operations may be formed on the periphery of a plate instead of forming the outline of an opening.

The operation of the machine will now be described. With a work piece W and template 72 supported on the work support 12 and with the tracer pin 70 in position on the head 51 adjacent the tool 54 as shown, the cams 13, 14 and 62 are very slowly rotated by motor 43, cam 62 rotating at half the speed of the work positioning cams 13 and 14. The first movement is that of cutter head 51 downward which engages the template 72 with the outer or lower cylindrical portion of pin 70 and the end portion of tool 54 with the work piece. With the tool 54 and pin 70 in this position the work support 12 is actuated by the cams 13 and 14, the movements of the work support 12 and work piece W being limited by the pin 70 bearing against the side of the template 72. By means of one rotation of the cams 13 and 14 the work piece W and template 72 are traversed completely about a closed curve corresponding to the form of the template 72. The cutter head 51 is then moved downward to its lower operative position as shown in Figs. 2 and 4 and the movement of the work support 12 again repeated about its closed path.

The first movement of the work support 12 causes the outer or reduced diameter portion of the tool 54 to cut an outline generally conforming to the desired outline but leaving a small amount of material to be cut away around the entire outline. Upon completion of one complete cycle of movements of the work piece W about the tool 54 the cutter head 51 moves down to its lowermost position. In this position the movements of the work support are repeated and, as the cutting is done with a larger diameter of tool 54 the outline throughout its extent is engaged and cut to a slightly different and enlarged outline. By adjustment of the pin 70 vertically so that the diameter of the conical portion engaging the edge of the template 72 is equal to the diameter of the tool 54 the outline cut into the work piece W will correspond exactly in size and shape to that of the template 72.

What we claim is:

1. A profiling machine comprising in combination, a base, a work support thereon, a template on said support, a cutting tool adapted to engage work mounted on said support, a tracer adapted to engage said template to guide said cutting tool during its operation, cam means to advance said tool and tracer into operative relation respectively with said work and template, cam means to actuate said work support to cut a predetermined outline in said work, and operating means for said cams controlling said tool and support whereby said tool and support are actuated in timed relation to each other.

2. A profiling machine comprising in combination, a base, a work support thereon, a template on said support, a cutting tool adapted to engage work mounted on said support, a tracer adapted to engage said template to guide said cutting tool during its operation, cam means to successively advance different diameters of said tool and tracer into operative relation respectively with said work and template, cam means to actuate said work support to cut a predetermined outline in said work, and operating means for said cams controlling said tool and support whereby said tool and support are actuated in timed relation to each other.

3. A profiling machine comprising in combination, a base, a work support thereon, a template on said support, a cutting tool adapted to engage work mounted on said support, a tracer mounted for movement with said tool and adapted to engage said template to guide said cutting tool during its operation, cam means to successively advance said tool and tracer to different operative relations with said work and template, and means to twice actuate said work support in a cycle to cut a predetermined outline in said work.

4. A profiling machine comprising in combination, a base, a work support, a template on said support and movable therewith, a cutting tool having portions of two diameters, a tracer having portions of different diameters, means to relatively move said tool and support to cut a predetermined outline in said work, and means to move said tool and tracer axially to engage said work and template respectively with different portions of said tool and tracer.

5. A profiling machine comprising in combination, a base, a work support, a template on said support and movable therewith, a cutting tool having portions of two diameters, a tracer having portions of different diameters, cam means to relatively move said tool and support to cut a predetermined outline in said work, and means to move said tool and tracer axially to engage said work and template respectively with different portions of said tool and tracer.

6. A profiling machine comprising in combination, a base, a work support, a template on said support and movable therewith, a cutting tool having portions of two diameters, a tracer having portions of different diameters, cam means to relatively move said tool and support a plurality of times in a closed path to cut predetermined outlines in said work, and means to move said tool and tracer axially to engage said work and template respectively with different portions of said tool and tracer at each movement of said support in a closed path.

7. A profiling machine comprising in combination, a base, a saddle slidably mounted thereon for movement in one direction, a work support on said saddle slidably mounted for movement in a direction normal to the direction of movement of said saddle, cams rotatably mounted in said base and resiliently connected to said saddle and support whereby simultaneous rotation of said cams will actuate said work support in a predetermined path, and a template limiting movements of said saddle and support effected by said cams.

8. A profiling machine comprising in combination, a base, a saddle slidably mounted thereon for movement in one direction, a work support on said saddle slidably mounted for movement in a direction normal to the direction of movement of said saddle, cams rotatably mounted in said base and resiliently connected to said saddle and support whereby simultaneous rotation of said cams will actuate said work support in a predetermined path, and means to limit movements of said saddle and support by said cams whereby different outlines may be profiled with the same cams.

9. A profiling machine comprising in combination, a base, a saddle slidably mounted thereon for movement in one direction, a work support on said saddle slidably mounted for movement in a direction normal to the direction of movement of said saddle, cams rotatably mounted within said base, levers connecting said cams respectively with said saddle and work support, said levers having resilient connections respectively with said saddle and support, and a template on said support limiting movement of said saddle and support by said cams.

10. A profiling machine comprising in combination, a base, a saddle slidably mounted thereon for movement in one direction, a work support on said saddle slidably mounted for movement in a direction normal to the direction of movement of said saddle, a cutter head having a rotatable cutting tool therein, cams rotatably mounted within said base, levers connecting said cams respectively with said saddle and work support, said levers having resilient connections respectively with said saddle and support, a tracer pin adjustably mounted on said cutter head, and a template on said support engaging said tracer pin for limiting movement of said saddle and support by said cams.

11. A profiling machine comprising in combination, a base, a saddle slidably mounted thereon for movement in one direction, a work support on said saddle slidably mounted for movement in a direction normal to the direction of movement of said saddle, a cutter head having a rotatable cutting tool therein having work engaging portions of different diameters, levers connecting said cams respectively with said saddle and work support, said levers having resilient connections with said saddle and support, a tracer pin movable with said support and having portions of different diameters, and a template on said support engaging said tracer pin on portions of different diameters limiting movement of said saddle and support by said cams.

12. A profiling machine comprising in combination, a base, a work support mounted on said base for movement in two directions normal to each other in a plane, a template on said work support and movable therewith, a cutter head movable in a direction normal to the plane of movement of said work support, means to actuate said support in a predetermined cycle of operations, a cutting tool rotatable within said head, a tracer pin on said cutter head adjacent and parallel to said tool, and cam means rotating with said actuating means for said support to move said cutting tool and tracer axially to successive operative positions relative to said work support and template during said cycle of operations.

13. A profiling machine comprising in combination, a base, a work support mounted on said base for movement in two directions normal to each other in a plane, a template on said work support and movable therewith, a cutter head movable in a direction normal to the plane of movement of said work support, means to actuate said support in a predetermined cycle of operations, a cutting tool rotatable within said head, a tracer therein, cam means rotating with said actuating means for said support to move said cutting tool and tracer axially to successive operative positions relative to said work support, and means to actuate said support in its predetermined path with the tool in each operative position.

14. A profiling machine comprising in combination, a base, a work support mounted on said base for movement in two directions normal to each other in a plane, a template on said work support and movable therewith, a cutter head movable in a direction normal to the plane of movement of said work support, means to actuate said support in a predetermined cycle of operations, a cutting tool having cutting portions of different diameters rotatable within said head, a tracer adjustable therein, said tracer having portions of different diameters, and cam means rotating with said actuating means for said support to move said cutting tool and tracer axially to successive operative positions relative to said work support in which said tracer engages said template upon the portions of different diameter.

CARROLL KNOWLES.
WILLIAM LAW.